United States Patent [19]

Fusiak

[11] Patent Number: 5,064,557

[45] Date of Patent: Nov. 12, 1991

[54] RESIN CLEANER COMPOSITION

[75] Inventor: Frank Fusiak, Bayonne, N.J.

[73] Assignee: ISP Investments Inc., Wilmington, Del.

[21] Appl. No.: 597,901

[22] Filed: Oct. 15, 1990

[51] Int. Cl.$^5$ .......................... C09D 9/00; C11D 7/50; B08B 7/00

[52] U.S. Cl. .................................... 252/162; 252/153; 252/170; 252/171; 134/38; 134/39; 134/40

[58] Field of Search ............... 252/153, 162, 170, 171; 134/38, 39, 40

[56] References Cited

U.S. PATENT DOCUMENTS

| | | | |
|---|---|---|---|
| 3,355,385 | 11/1967 | Mackley | 252/104 |
| 4,120,810 | 10/1978 | Palmer | 252/153 |
| 4,147,821 | 4/1979 | Young | 252/DIG. 1 |
| 4,664,721 | 5/1987 | Valasek | 252/153 |
| 4,865,758 | 9/1989 | Caster et al. | 252/162 |

*Primary Examiner*—Paul Lieberman
*Assistant Examiner*—William S. Parks
*Attorney, Agent, or Firm*—Walter Katz; Marilyn J. Maue; Joshua J. Ward

[57] ABSTRACT

A resin cleaner composition is provided herein for use as a cleaning solvent to remove cured, partially cured and uncured polyester or vinyl ester resin containing a free radical polymerization initiator from resin fabrication tools. The composition is characterized by the presence therein of a free radical inhibitor which suppresses the rate of free radical polymerization. Thereby the resin can be loaded in increased amounts in the composition without an accompanying increase in polymerization of the resin.

12 Claims, No Drawings

RESIN CLEANER COMPOSITION

BACKGROUND OF THE INVENTION

1. Field of the Invention

This invention relates to a resin cleaner composition for use in the fiberglass fabrication industry, and more particularly, to a solvent composition which achieves an increased resin loading in the solvent without increasing its rate of polymerization.

2. Description of the Prior Art

Traditionally, companies which use fiberglass in the manufacture of boats, automobile parts, tanks, panels and the like have used acetone as a clean-up solvent. While acetone is a very effective solvent for uncured fiberglass, i.e. unsaturated polyester or vinyl ester resins containing polymerization initiators, it is a highly volatile, low flash point, material which is considered hazardous and flammable, and which is listed by the EPA in Section 313 as a toxic substance. Furthermore, the loading of uncured fiberglass in acetone is limited by the rate of polymerization or gellation of the uncured resin in acetone solution. Accordingly, after a short period of use, the resin solution must be discarded and fresh solvent used.

An improved substitute for acetone for this use is available in the form of N-methylpyrrolidone (M-Pyrol®) or NMP, which is an excellent solvent for fiberglass resins, much less volatile than acetone, biodegradable, substantially less toxic, and which exhibits loading characteristics at least comparable to that displayed by acetone. However, the art has desired a resin cleaner composition having the advantageous properties of NMP with increased fiberglass loading properties during use.

Accordingly, it is an object of the present invention to provide a resin cleaner composition having the advantageous features of NMP solvent and which exhibits increased fiberglass loading and decreased gellation during use.

Another object of this invention is to provide a composition which inhibits the rate of polymerization of polyester and vinyl ester resins containing polymerization initiators thus increasing the loading factor of the composition.

These and other objects and features of the invention will be made apparent from the following description of the suitable and preferred embodiments of the invention.

SUMMARY OF THE INVENTION

A resin cleaner composition is provided herein for use as a cleaning solvent to remove cured, partially cured and uncured polyester or vinyl ester resin containing a free radical polymerization initiator from fiberglass fabrication tools. The composition is characterized by the presence therein of a free radical inhibitor which suppresses the rate of free radical polymerization. Thereby the resin can be loaded in increased amounts in the composition without an accompanying increase in polymerization of the resin.

In the preferred form of the invention, the inhibitor is a substituted phenol, e.g. vanillin, 4-t-butylcatechol, hydroquinone, butylated hydroxytoluene and the like, and the solvent is NMP, optionally including a diluent such as a dibasic acid ester (DBE), such as dimethyl adipate, dimethyl glutarate, dimethyl succinate, γ-butyrolactone (BLO), tetrahydrofurfuryl alcohol, propylene glycol ethers, propylene carbonate, dimethyl imidazolidinone, tetramethyl urea, terpenes, and mixtures thereof. The substituted phenol inhibitor suitably is present in the amount of at least about 0.005% by weight of the composition, preferably about 0.01–0.03%, and optimally, about 0.02%.

DETAILED DESCRIPTION OF THE INVENTION

In accordance with the invention, the resin cleaner composition comprises:

TABLE

|  | % by Weight in Composition | | |
|---|---|---|---|
|  | Suitable | Preferred | Optimum |
| Essential Components | | | |
| NMP | 5–99.9 | 30–70 | 49.7 |
| Inhibitor | at least 0.005 | 0.01–0.03 | 0.02 |
| e.g. substituted phenol | | | |
| Optional Components | | | |
| Diluent | 0–95 | 30–70 | 49.7 |
| e.g. BLO or DBE | | | |
| Surfactant | 0–1.5 | 0.2–1.0 | 0.5 |
| e.g. Emulphogene ® DA 630 | | | |
| Odor masking agent | 0–0.2 | 0.05–0.15 | 0.1 |
| e.g. Arylene ® T | | | |

The solvent and diluent in the composition of the invention perform the desired role of effectively removing the cured, partially cured and uncured polyester or vinyl ester resin from the work tools used in the fiberglass fabrication industry. The inhibitor material therein functions to interfere with free radical polymerization of catalyzed resin to reduce the rate of polymerization or gellation of the uncured resin in the solvent. In use the composition thus increases the uncured resin loading factor in the composition.

A typically free radical initiator used to cure the resin composition is methyl ethyl ketone peroxide, although other free radical initiators known in the art may be employed.

The inhibitor used in this invention to suppress or interfere with free radical polymerization suitably is soluble in the solvent composition and is effective in a reasonably small amount. Substituted phenols are preferred inhibitors for this purpose. Preferred substituted phenols include such compounds as vanillin, butylcatechol, hydroquinone and butylated hydroxy toluene.

Suitably the inhibitor is present in a concentration of at least 0.005% by weight of the composition, preferably about 0.01–0.03%, and optimally about 0.02%. These amounts will provide effective inhibition of free radical polymerization of the resin to increase resin loading in the composition. Furthermore, within these ranges, the desired polymerization of the resin on the workpiece will not be affected significantly by inhibitor left on the worktool caused by incomplete water washing or drying of the composition from the worktool.

EXAMPLE.

In use in a test fiberglass fabrication operation, the compositions of the invention exhibit 40–60% increased loading of fiberglass resin without increased gellation as compared to the same composition without the inhibitor component therein. A typical composition performs as follows:

| Base Formula | Wt. % |
|---|---|
| M-Pyrol ® | 49.2 |
| BLO | 49.2 |
| Arylene ® T | 0.1 |
| Emulphogene ® DA 630 | 0.5 |

| Concentration (g resin/ 50 g. solvent) | Gellation of Base Formulation | Gellation of Base Formulation with 0.02% BHT added |
|---|---|---|
| 5 | F[4] | F[4] |
| 10 | F[4] | F[4] |
| 15 | F[4] | F[4] |
| 20 | F[3] | F[4] |
| 25 | F[2] | F[4] |
| 30 | F[1] | F[4] |
| 35 | G (~80%) | F[4] |
| 40 | G (>90%) | F[4] |

F = Fluid (no gel)
G = Gelled in 24 hrs. (Parenthesis indicates % gellation)
[1] Gelled ~80% in 72 hrs.
[2] Gelled ~70% in 144 hrs.
[3] Gelled 5% in 144 hrs.
[4] Still fluid after 30 days While the invention has been described with particular reference to certain embodiments thereof, it will be understood that changes and modifications may be made which are within the skill of the art. Accordingly, it is intended to be bound only by the following claims, in which:

What is claimed is:

1. A resin cleaner and inhibitor composition for cleaning cured, partially cured and uncured unsaturated polyester or vinyl ester resin while reducing the rate of undesired in situ polymerization of such uncured, unsaturated polyester or vinyl ester resin in the presence of an organic solvent containing a free radical polymerization initiator consisting essentially of N-methyl-2-pyrrolidone solvent and at least about 0.005% by weight of the composition of a substituted phenol free radial polymerization inhibitor therein to suppress the rate of such undesired free radical polymerization with the optional presence of at least one member of the group consisting of diluents, odor masking agents and surfactants.

2. A composition according to claim 1 wherein said substituted phenol polymerization inhibitor is selected from vanillin, 4-butylcatechol, hydroquinone and butylated hydroxy toluene.

3. A composition according to claim 1 wherein said diluent is γ-butyrolactone; a dibasic acid ester selected from dimethyl adipate, dimethyl glutarate and dimethyl succinate; tetrahydrofurfuryl alcohol, propylene glycol ethers, propylene carbonate, dimethyl imidazolidinone, tetramethyl urea, terpenes, and mixtures thereof.

4. A composition according to claim 3 which includes about 30–70% by weight of the composition of N-methyl-2-pyrrolidone and about 30–70% by weight of the composition of γ-butyrolactone.

5. A composition according to claim 4 which includes about 50% by weight of N-methyl-2-pyrrolidone and about 50% by weight of γ-butyrolactone.

6. A composition according to claim 1 wherein said inhibitor is present in an amount of at least about 0.005% by weight of said composition.

7. A composition according to claim 6 wherein said amount of inhibitor is about 0.01–0.03%.

8. A composition according to claim 6 wherein said amount of inhibitor is about 0.02%.

9. A resin cleaner composition consisting put in missed data in pencil of N-methyl-2-pyrrolidone solvent, at least about 0.005% by weight of the composition of a substituted phenol free radical polymerization inhibitor, about 0–95% by weight of the composition of a diluent, about 0–1.5% by weight of the composition of a surfactant, and about 0–0.2% by weight of the composition of an odor masking agent.

10. A composition according to claim 9 consisting essentially of about 30–70% by weight of the composition of N-methyl-2-pyrrolidone solvent, about 30–70% by weight of the composition of a diluent selected from γ-butyrolactone; a dibasic acid ester selected from dimethyl adipate, dimethyl glutarate and dimethyl succinate; tetrahydrofurfuryl alcohol, propylene glycol ethers, propylene carbonate, dimethyl imidazolidinone, tetramethyl urea, terpenes, and mixtures thereof, and about 0.01–0.03% by weight of the composition of said inhibitor.

11. A composition according to claim 10 which includes about 0.2–1.0% by weight of a surfactant.

12. A composition according to claim 11 which includes about 0.05–0.15% by weight of an odor masking agent.

* * * * *